(12) United States Patent
Lee (10) Patent No.: US 9,168,964 B1
(45) Date of Patent: Oct. 27, 2015

(54) BICYCLE EQUIPPED WITH ELECTRIC GENERATOR AT SADDLE AREA

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 14/280,656

(22) Filed: May 18, 2014

(51) Int. Cl.
*B62J 6/06* (2006.01)
*B62J 99/00* (2009.01)
*B62J 6/00* (2006.01)
*B62J 6/04* (2006.01)

(52) U.S. Cl.
CPC .... *B62J 6/06* (2013.01); *B62J 6/00* (2013.01); *B62J 6/04* (2013.01); *B62J 99/00* (2013.01); *B62J 2099/004* (2013.01)

(58) Field of Classification Search
CPC ....................................... B62J 6/00; B62J 6/06
See application file for complete search history.

(56) References Cited

U.S. PATENT DOCUMENTS

| 2010/0013241 A1* | 1/2010 | Yeh | 290/1 C |
| 2013/0049374 A1* | 2/2013 | Chen | 290/1 R |

FOREIGN PATENT DOCUMENTS

CN 201240452 Y * 5/2009

* cited by examiner

*Primary Examiner* — Kevin Hurley (57) ABSTRACT

A bicycle includes a bicycle body, an electric generator disposed in a saddle area of the bicycle body and an electronic device connected to the electric generator to be powered by the latter. The electric generator includes a piezoelectric transducer, a storage battery and an electric power output port connected to the piezoelectric transducer and the storage battery. The piezoelectric transducer is configured to transform mechanical vibration energy available on the saddle area into electricity during cycling. The storage battery is coupled to the piezoelectric transducer for storing the electricity generated by the piezoelectric transducer. The electronic device is connected to the electric power output port to be powered by either the piezoelectric transducer or the storage battery.

12 Claims, 8 Drawing Sheets

BICYCLE EQUIPPED WITH ELECTRIC GENERATOR AT SADDLE AREA

BACKGROUND OF THE INVENTION

1. Field of the Invention

The present invention relates to a bicycle, and more particularly to a bicycle equipped with an electric generator to power an electronic device.

2. Description of the Related Art

Electronic devices on a bicycle, either front or rear lamp for lighting at night, are fed almost exclusively via a dynamo or by batteries. Both power system has disadvantages. With the dynamo, the cyclist is obliged to provide more effort than necessary for the movement, since it takes an extra effort to compensate for the friction of the dynamo. The use of the battery can be restrictive and not eco-friendly. Accordingly, there exists a need for powering the electronic devices without the disadvantages as described above. The development of the present invention substantially departs from the conventional solutions and in doing so fulfills this need.

SUMMARY OF THE INVENTION

Accordingly, it is an object of the present invention to provide a bicycle equipped with an electric generator to satisfy the aforementioned need. The bicycle includes a bicycle body, an electric generator disposed in a saddle area of the bicycle body and an electronic device connected to the electric generator to be powered by the latter. The electric generator includes a piezoelectric transducer, a storage battery and an electric power output port connected to the piezoelectric transducer and the storage battery. The piezoelectric transducer is configured to transform mechanical vibration energy available on the saddle area into electricity during cycling. The storage battery is coupled to the piezoelectric transducer for storing the electricity generated by the piezoelectric transducer. The electronic device is connected to the electric power output port to be powered by either the piezoelectric transducer or the storage battery.

Preferred embodiments of the invention may have the following additional characteristics, either alone or in combination:

The bicycle body includes at the saddle area a seat post and a saddle. The saddle includes a saddle shell and seat rails which are mounted along an underside of the saddle shell and clamped to the seat post. In one embodiment, the electric generator is mounted on a bottom surface of the saddle shell. In a modified embodiment, the electric generator is mounted on the seat rails. In yet another modified embodiment, the electric generator is mounted on the seat post.

Further benefits and advantages of the present invention will become apparent after a careful reading of the detailed description with appropriate reference to the accompanying drawings.

DETAILED DESCRIPTION OF EMBODIMENTS

In the accompanying drawings, a bicycle 100 according to a first embodiment is illustrated which generally includes a bicycle body 2, a bike powered electric generator 1 disposed in a saddle area of the bicycle body 2 and an electronic device 7, such as a bike tail light, to be powered by the electric generator 1.

As is conventional, the bicycle body 2 includes at its saddle area a saddle 21 and a seat post 22. The saddle 21 includes a saddle shell 211 and seat rails 212 mounted along an underside of the saddle shell 211 and clamped to the seat post 22.

Figure 3:
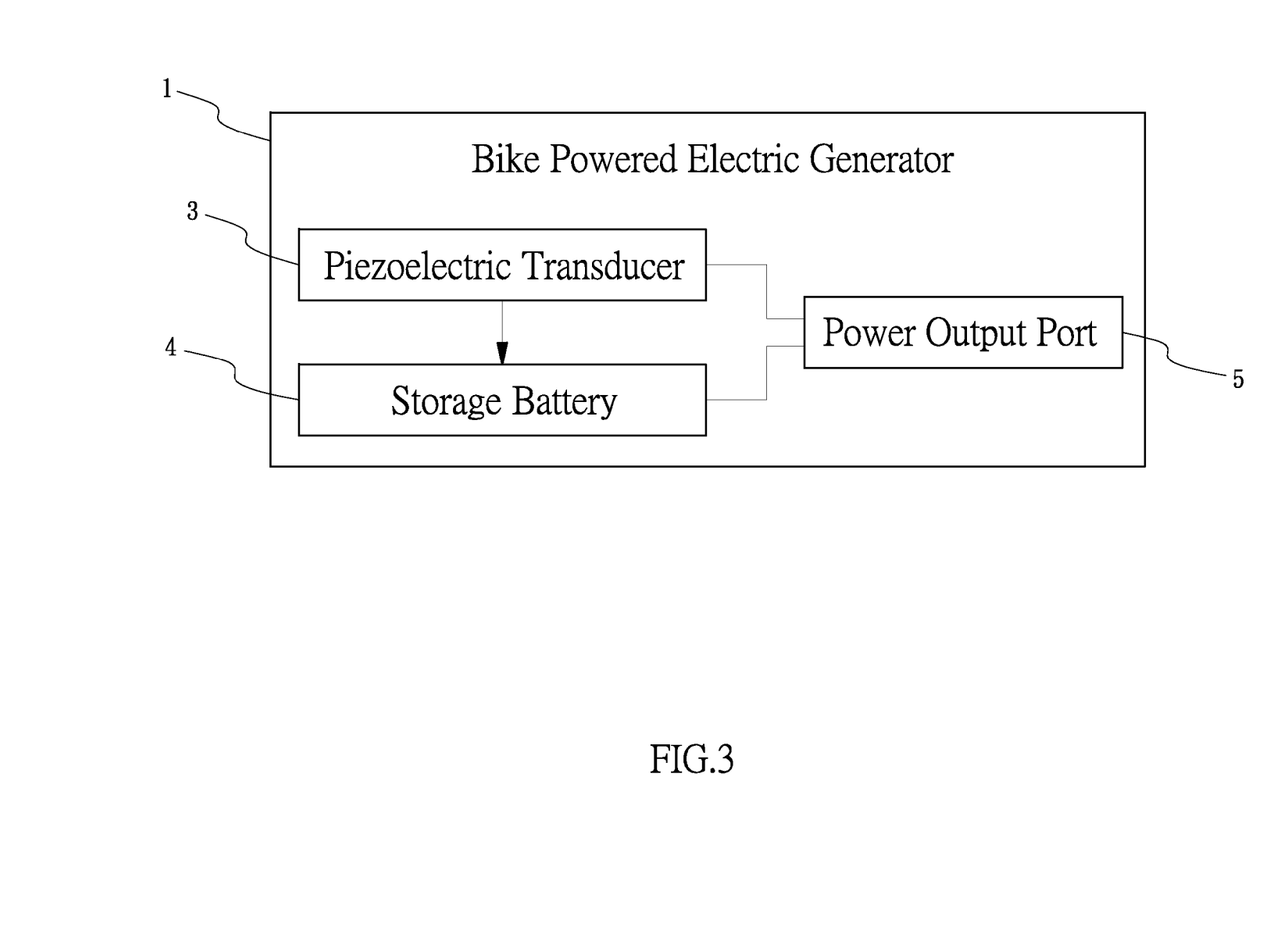
FIG. 3 is a block diagram of the electric generator shown in FIG. 1.
Figure 4:
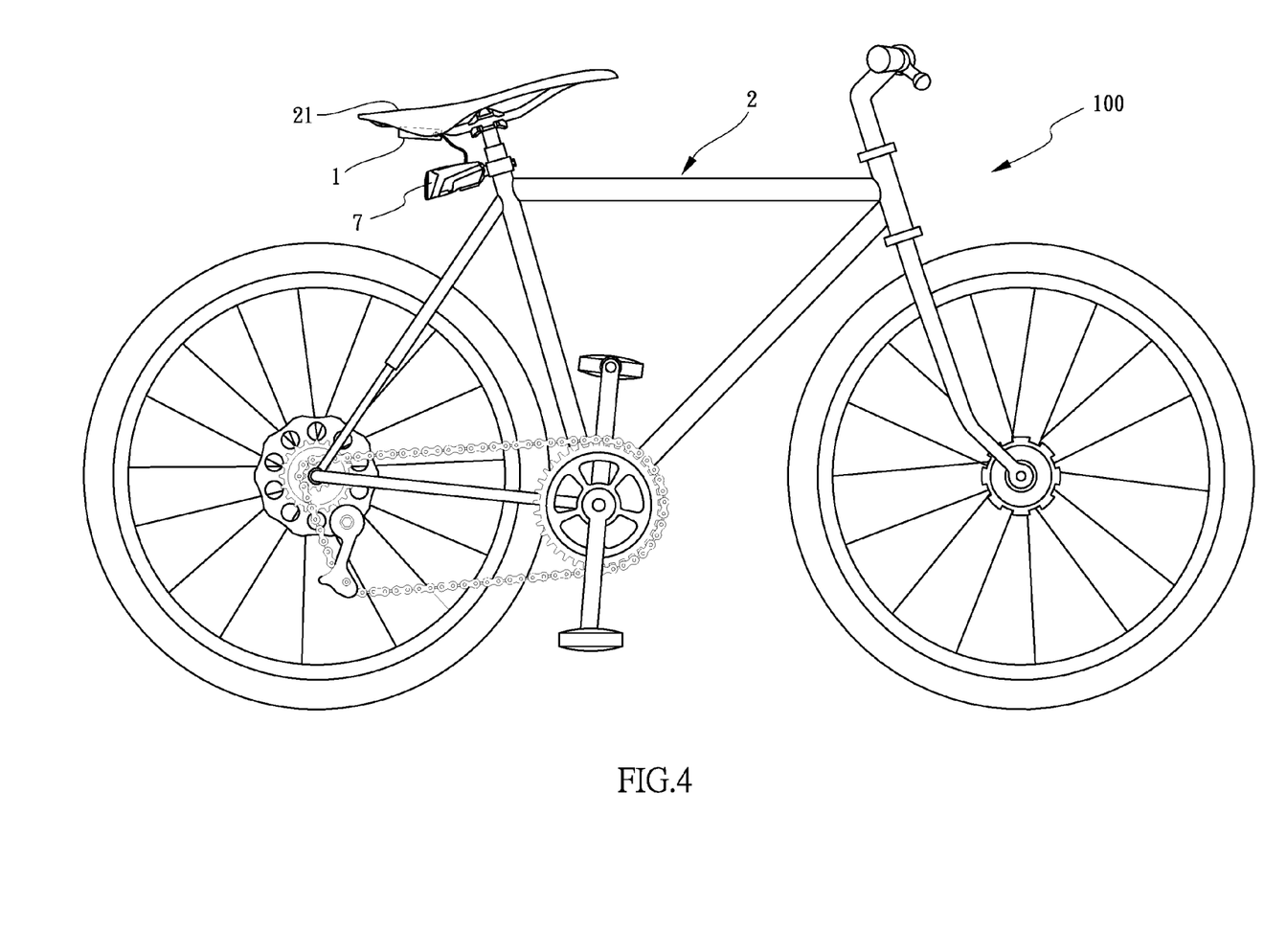
FIG. 4 is a side view of the bicycle shown in FIG. 1.
Figure 5:
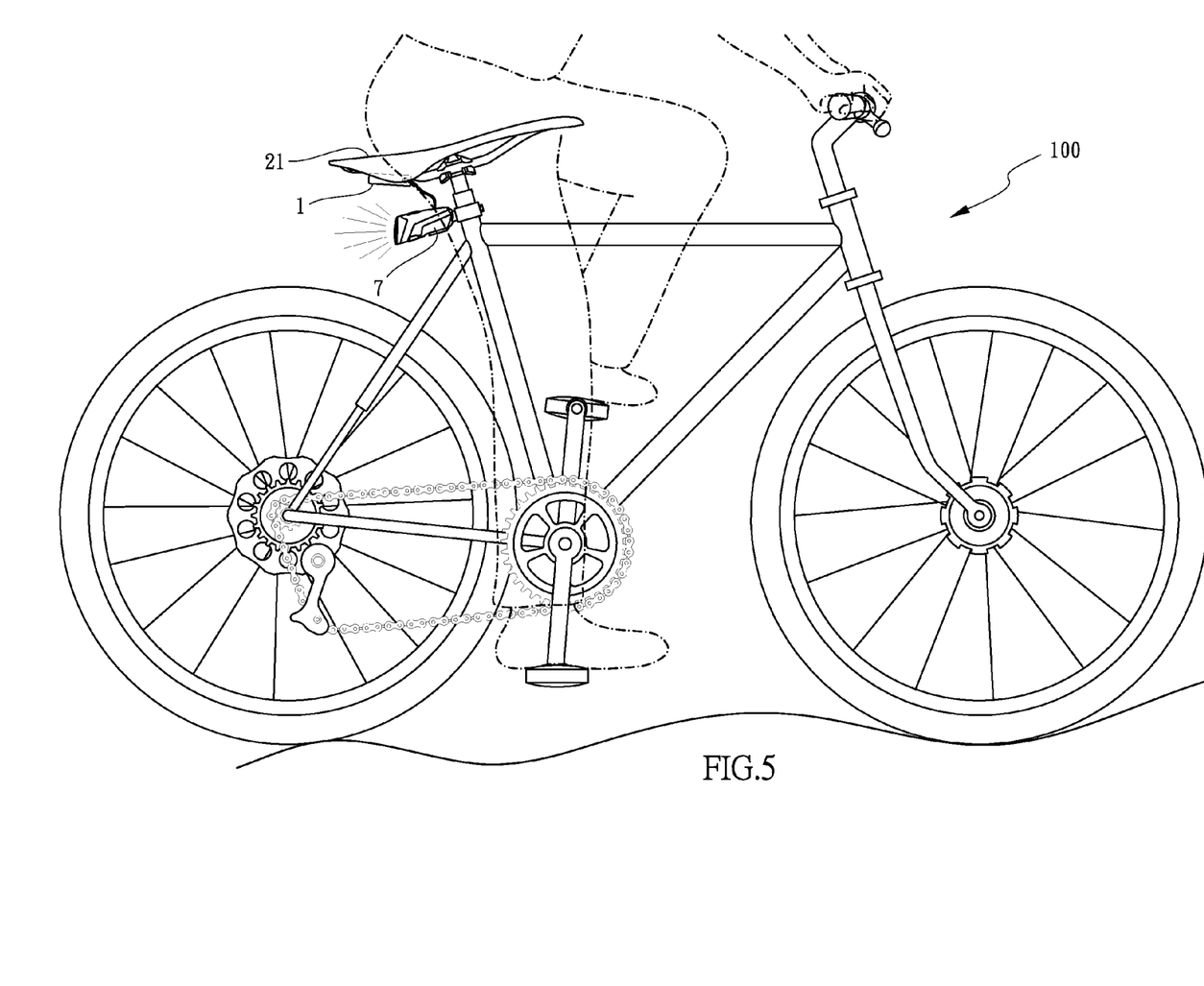
FIG. 5 illustrates that while a cyclist depicted in phantom lines is riding on the bicycle of FIG. 4, the bike tail light of the bicycle is powered by the electric generator.

As shown in FIG. 3, the bike powered electric generator 1 includes a piezoelectric transducer 3, a storage battery 4 and an electric power output port 5 connected to the piezoelectric transducer 3 and the storage battery 4. The piezoelectric transducer 3 is provided to transform mechanical vibration energy available on the saddle area into electricity, during cycling. Preferably, the piezoelectric transducer 3 includes a piezo ceramic material that has the ability to provide relatively higher voltage that that of quartz under a given force. The storage battery 4 is coupled to the piezoelectric transducer 3 using a wire or wirelessly for storing the electricity generated by the piezoelectric transducer 3. In such a manner, the electronic device 7, which is connected to the electric power output port 5, can be powered either directly by the piezoelectric transducer 3 or indirectly by the storage battery 4. As shown in FIG. 5, the bike tail light 7 lights up during cycling.

Figure 1:
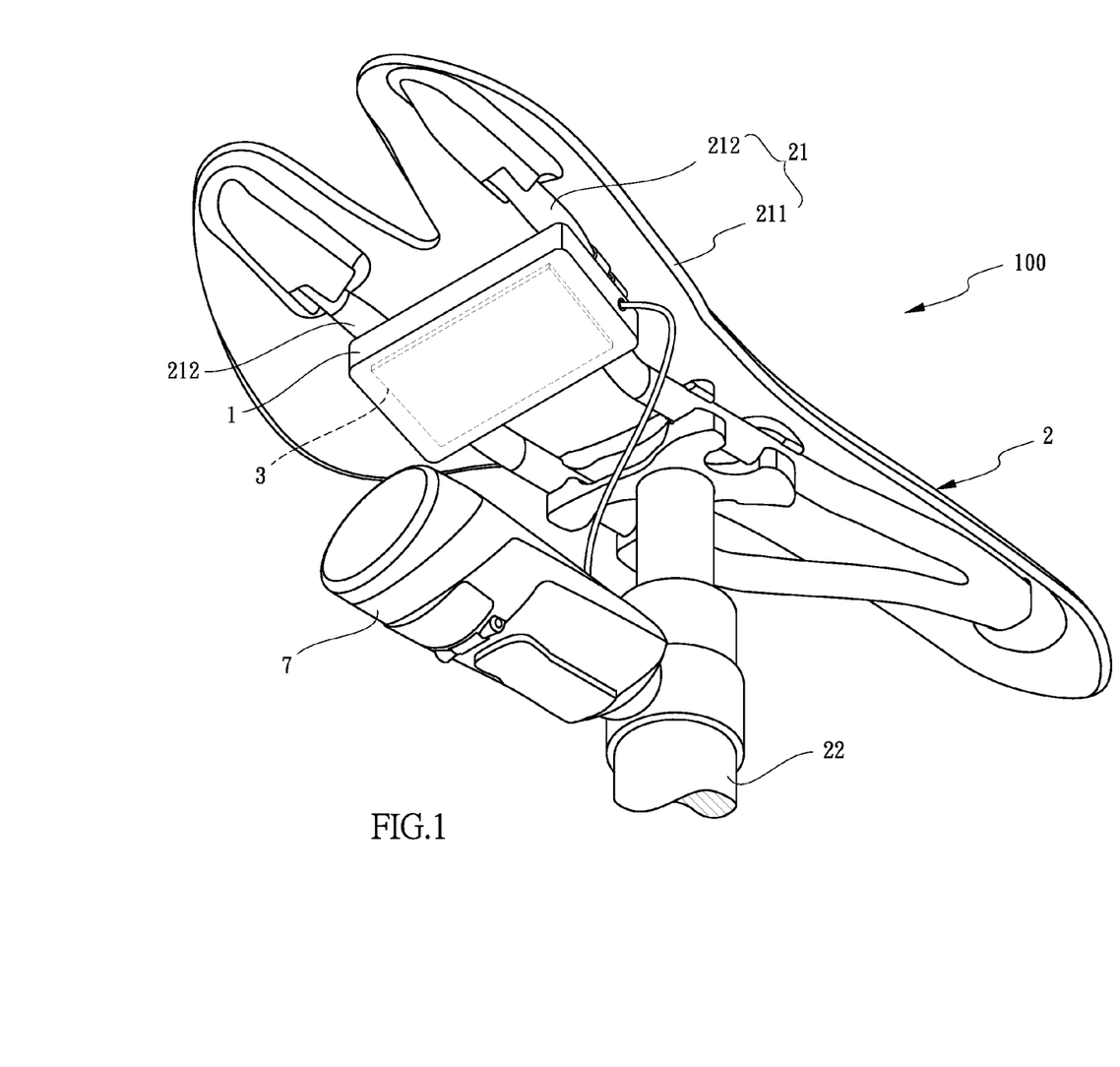
FIG. 1 is a partial perspective view of a bicycle equipped with an electric generator in accordance with a first embodiment of the present invention.
Figure 2:
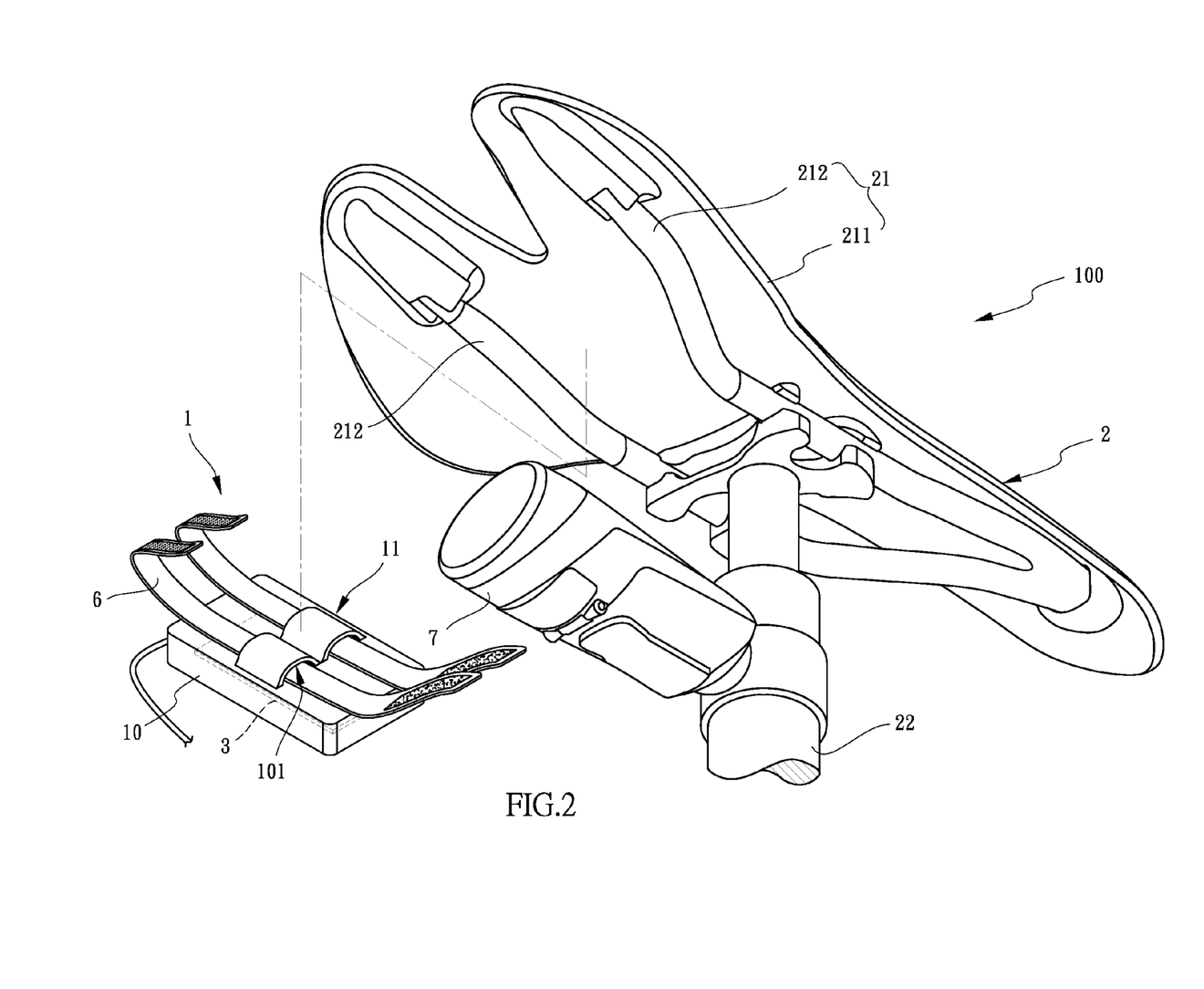
FIG. 2 is an exploded perspective view of the bicycle shown in FIG. 1.

Referring back to FIG. 2, the piezoelectric transducer 3 and the storage battery (not shown in FIG. 2) are housed in a housing 10 of the electric generator 1. In this embodiment, the electric generator 1 is attached to the seat rails 212 of the saddle 21 by means of two Velcro straps 6, as shown in FIG. 1. Specifically, the straps 6 pass through the respective connecting holes 101 in the housing 10 to bind the electric generator 1 onto the seat rails 212 of the saddle 21.

Figure 7:
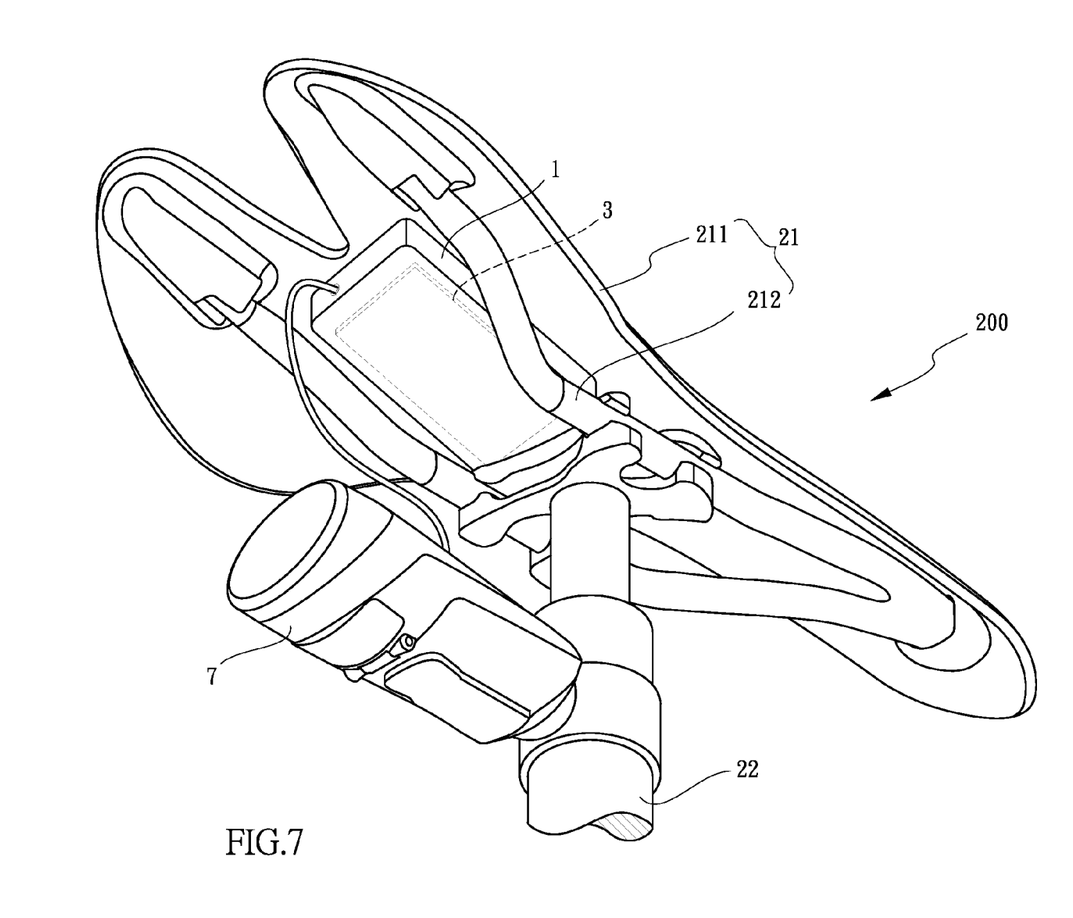
FIG. 7 is a partial perspective view of a bicycle equipped with an electric generator in accordance with a second embodiment of the present invention.
Figure 8:
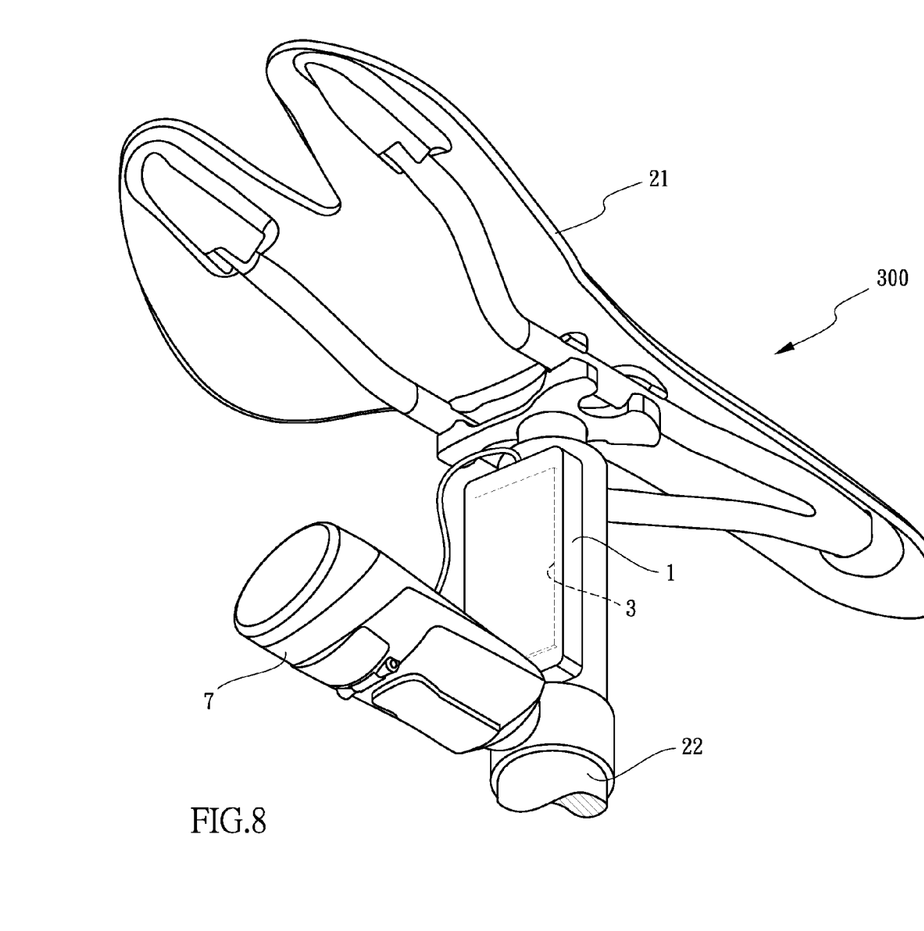
FIG. 8 is a partial perspective view of a bicycle equipped with an electric generator in accordance with a third embodiment of the present invention.

In the second embodiment shown in FIG. 7, the electric generator 1 is mounted on a bottom surface of the saddle shell 211 of the saddle 21. Alternatively in the third embodiment shown in FIG. 8, the electric generator 1 is mounted on the seat post 22.

Figure 6:
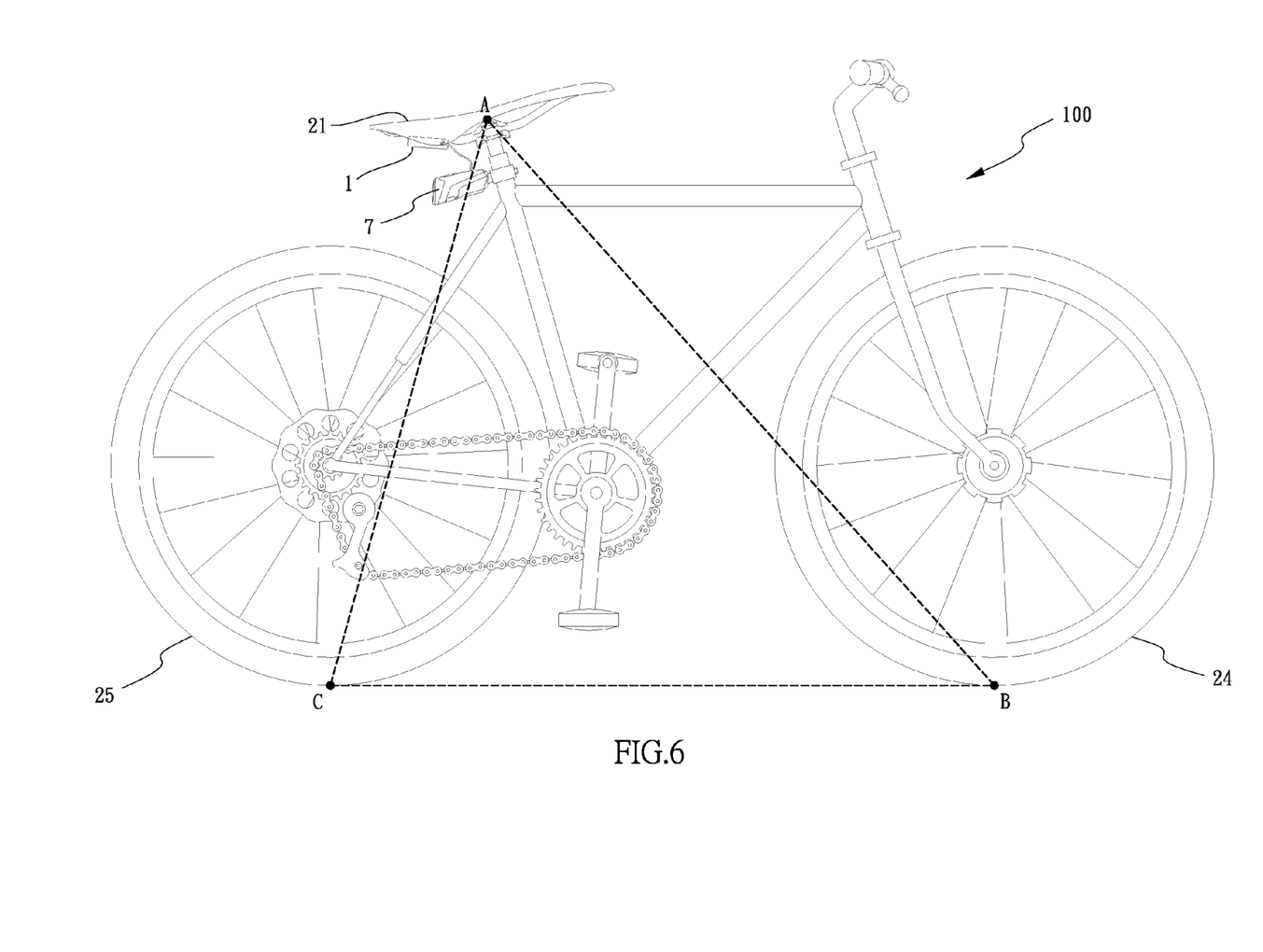
FIG. 6 is a view generally similar to FIG. 4.

Referring to FIG. 6, the cyclist's riding in balance is substantially based on the three vertices A, B and C of a triangle as shown by dotted lines. The lower two vertices B and C are located on the bottom of the front and rear wheels 24, 25 while the upper vertex A is at the saddle area of the bicycle. It is believed that the electric generator 1 which is positioned on the saddle area and subjected to the weight of the cyclist can harvest more energy from the bicycle than other areas.

It is to be understood that the disclosed embodiments are illustrative in nature and the invention is not to be limited to any one or more embodiments except as set forth in the following claims.

What is claimed is:

1. A bicycle comprising:
a bicycle body having a saddle area which has a seat post and a saddle, the saddle including a saddle shell and seat rails which are mounted along an underside of the saddle shell and clamped to the seat post;
an electric generator mounted on a bottom surface of the saddle shell of the saddle of the saddle area of the bicycle body and having a piezoelectric transducer to transform mechanical vibration energy available on the saddle area into electricity during cycling; and
an electronic device connected to the electric generator to be powered by the latter.

2. The bicycle as recited in claim 1, wherein the bicycle body includes at the saddle area a seat post and a saddle, and the saddle includes a saddle shell and seat rails which are mounted along an underside of the saddle shell and clamped to the seat post, and wherein the electric generator is mounted on the seat rails.

3. The bicycle as recited in claim 2, wherein the electric generator further includes a housing in which the piezoelectric transducer is housed, and the housing defines at least one connecting hole, and wherein the electric generator further comprises at least one strap passing through the connecting hole in the housing to bind the electric generator to the seat rails of the saddle.

4. The bicycle as recited in claim 3, wherein the strap is a Velcro strap.

5. The bicycle as recited in claim 1, wherein the bicycle body includes at the saddle area a seat post and a saddle attached to the seat post, and the electric generator is mounted on the seat post.

6. The bicycle as recited in claim 1, wherein the bicycle body includes at the saddle area a seat post and a saddle attached to the seat post, and the electronic device is a bike tail light mounted on the seat post.

7. The bicycle as recited in claim 1, wherein the electric generator further includes a storage battery coupled to the piezoelectric transducer for storing the electricity generated by the piezoelectric transducer.

8. The bicycle as recited in claim 7, wherein the storage battery is wirelessly coupled to the piezoelectric transducer.

9. The bicycle as recited in claim 7, wherein the electric generator further includes an electric power output port connected to the piezoelectric transducer and the storage battery.

10. The bicycle as recited in claim 9, wherein the electronic device is connected to the electric power output port to be powered by either the piezoelectric transducer or the storage battery.

11. The bicycle as recited in claim 10, wherein the bicycle body includes at the saddle area a seat post and a saddle attached to the seat post, and the electronic device is a bike tail light mounted on the seat post.

12. The bicycle as recited in claim 1, wherein the piezoelectric transducer comprises a piezo ceramic material.

* * * * *